TELEPHONE SWITCH CONTROL DEVICES

Filed Feb. 13, 1958 3 Sheets-Sheet 1

INVENTOR.
MILTON L. SNOW

BY

[signature]
ATTORNEY

INVENTOR.
MILTON L. SNOW

BY

ATTORNEY

INVENTOR.
MILTON L. SNOW
BY
ATTORNEY

United States Patent Office 2,961,498

Patented Nov. 22, 1960

2,961,498

TELEPHONE SWITCH CONTROL DEVICES

Milton L. Snow, 150 Broadway, New York, N.Y.

Filed Feb. 13, 1958, Ser. No. 715,056

20 Claims. (Cl. 179—148)

The present invention relates to a device or mechanism for controlling the main circuit switch of a conventional telephone instrument, such as the conventional desk telephone, from a point at a distance therefrom.

The conventional telephone instrument consists of a base which may be disposed on a supporting surface and contains the main instrument switch that is spring tensioned to be normally closed and is opened by the weight of the telephone handpiece which combines the ear and mouthpieces, by resting the latter upon the switch controlling pins or lever projecting to the exterior of the base to depress them into switch opening position.

It has heretofore been proposed, in connection with such conventional telephone instruments or sets, to provide a support for the handpiece thereof, for use during telephone conversations, that may be conveniently adjusted and arranged to support the handpiece in proximity to the user's mouth and ears during use, to thereby free the user's hands for whatever purpose he may require them.

It has also heretofore been proposed, in order to avoid the necessity for the removal of the handpiece from the adjustable support and its replacement upon the instrument base, at the end of each conversation, to break the circuit through the instrument, to provide substitute means for depressing the projecting pins or lever. Heretofore, such substitute switch controlling means were positioned and actuated manually directly above or closely adjacent to the switch pins or lever of the instrument base. This required maintaining the instrument base within convenient reach of the telephone user, in relatively close proximity to him. Such positioning of the telephone instrument base of necessity limited the space in front of the user and, to a large extent, nullified the advantage of having his hands free, for the reason that he was allowed only a limited space within which to use them.

The present invention is directed to the provision, in combination with an adjustable stand for supporting the handpiece of a telephone instrument, of substitute means for manipulating the main instrument switch in the base of the instrument from a point remote from its switch pins or lever, to thereby allow the user a greater clear area in front of him within which he can manipulate and work with his free hands.

It is another object of the present invention to provide, in combination with an adjustable support for the handpiece of a telephone instrument, of a device for controlling the main instrument switch of the base thereof from a point remote thereto, which is simple, easy and convenient to operate and use.

It is also an object of the present invention to provide, in combination with an adjustable support for the handpiece of a telephone instrument, of a device for controlling the main switch of the base thereof which is highly effective and efficient for its purpose and sure and efficient in its operation.

It is still another object of the present invention to provide a device for controlling the main switch of a telephone instrument, of the character described, which is of relatively simple and sturdy construction and relatively economical to produce.

It is a further object of the present invention to provide a device for controlling the switch of the base of a telephone instrument from a point remote thereto which is of attractive appearance and will enhance the appearance of a desk or table upon which the device is rested.

It is a still further object of the present invention to provide adjustable supporting means for the handpiece of a telephone instrument which permits the quick, easy, yet secure association of the handpiece with the supporting stand and also permits the equally rapid, easy and convenient removal of the handpiece from the supporting stand.

The foregoing and other objects and advantages of the telephone base switch control means of the present invention will become more readily apparent to those skilled in the art from the several embodiments of the invention shown in the accompanying drawing and from the description following. It is to be understood, however, that such embodiments are shown for purposes of illustration only, to make the principles and practice of the invention more readily comprehensible, and without any intent of limiting the invention to the specific details therein shown.

Generally stated, the invention consists in the provision, in combination with the base of a telephone instrument and over the handpiece cradle thereof, of a generally horizontally disposed member that is vertically reciprocable for movement in and out of contact with the switch pins extending into the cradle; means for guiding the member in its vertical reciprocation; means for automatically moving the member either upwardly or downwardly, out of and into contact with the switch pins, and mechanical means, extending to a side of the base, for reversing the automatic movement of the member; and means for releasably retaining the member in its reversed position.

In one form of the invention, the member may be normally automatically maintained in depressing contact with the switch pins, to maintain the switch in open, circuit breaking position, as by gravity or by spring tension, and is manually returned and upwardly moved and releasably maintained in the switch closing position. In another embodiment of the invention, the horizontal, vertically reciprocable member may be automatically maintained in spaced relation to the switch pins, to normally maintain the switch in circuit closing position, as by means of spring tension, and is manually downwardly movable and releasably retainable in switch opening, circuit breaking position.

Figures 1, 2:
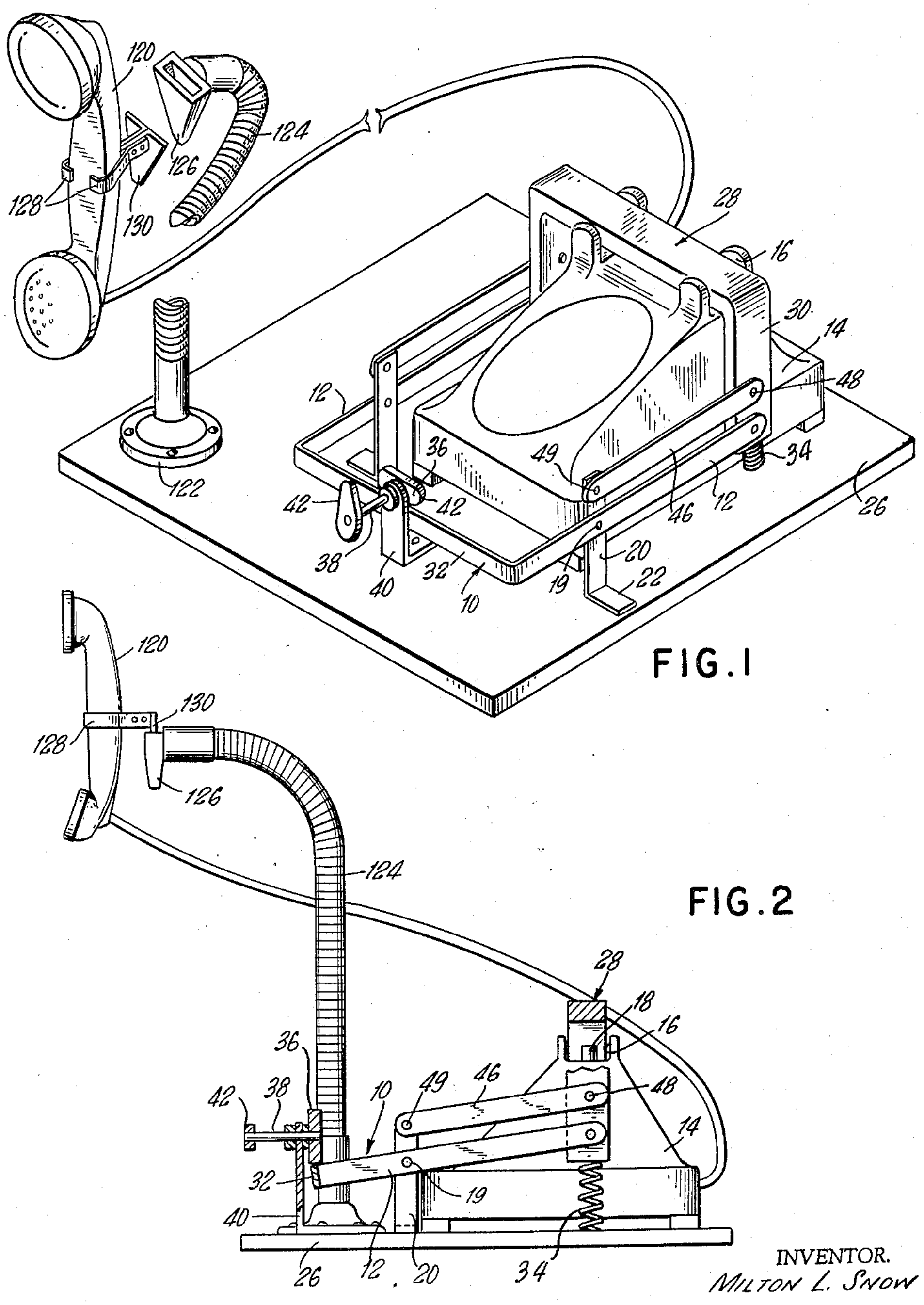
Fig. 1 is an exploded, foreshortened, perspective view of combined instrument base, handpiece, means for supporting and assembling the handpiece with an adjustable base, and one form of switch control means for the telephone base, with the switch shown in open position.
Fig. 2 is a side elevational and partly sectional view of the instrument of Fig. 1, with the handpiece shown as supported on the adjustable stand and the base switch in closed position.
Figure 3:
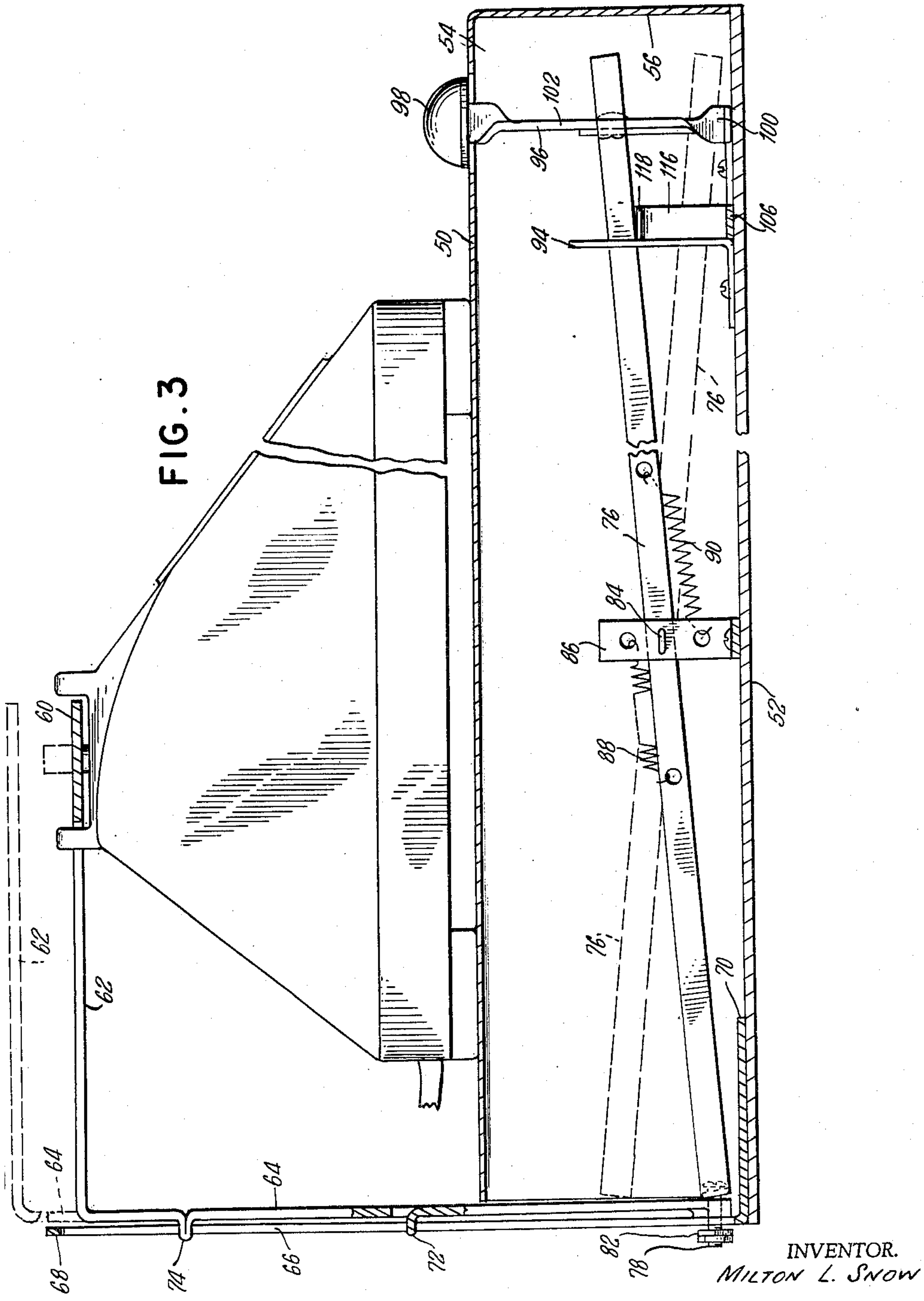
Fig. 3 is a vertical sectional and partly elevational view of another embodiment of a switch control device of the present invention, shown with the switch in open position; the dotted lines indicating the position of the device when the switch is closed.

Referring now in greater detail to the accompanying drawings, and with particular reference to the embodiment of the invention shown in Figs. 1 and 2 thereof, the same illustrate a device which comprises a lever, preferably of U-shape, generally designated as 10, which may be formed of a metallic bar or rod, or of similar, suitable rigid material. The lever frame 10 is of a width sufficient to accommodate between its arms 12, the width of a telephone instrument base 14, and is of a length sufficient at least to accommodate such base 14 from its forward or dial end to and including the handpiece cradle 16, thereof, into which extend the switch pins 18.

The lever frame 10 is pivotally supported in substantially horizontal position, intermediate the ends of each of its arms 12, on a post or upright bracket 20, which may be provided with laterally offset end portion 221 that rests upon and is secured, in any desired manner, as by set screws, on a base plate 26. The arms 12 support between them, at their outer ends, substantially in line with and above the cradle 16, an inverted U-shape member 28, which is connected by the ends of its arms 30 to the frame arms 12. It will be apparent that, as the forwardly disposed web 32, of the frame 10 is pushed up or down, the inverted U-member 28 will be moved down or up, to contact and depress or to be moved away from and release the switch pins 18.

Means are provided for retaining the inverted U-member 28 normally automatically in pin depressing position. This may be effected by making the U-member 28 of sufficient weight to maintain it in lowered position gravitationally. Or, it may be kept in such lowered position by one or more contracting coil springs, as 34, one end of which may be secured to the plate 26 and the other end to a frame arm 12, adjacent its free end.

Means are also provided adjacent the forward end of the lever frame 10 for releasably maintaining such forward end in depressed position, to maintain the telephone base switch closed. Such means may comprise any releasable latch means that may be supported upon the plate 26, in position to releasably engage the web of the lever frame 10, or, if desired, an extension thereof. In the preferred, illustrated embodiment there is provided for the purpose which will both depress and releasably engage the web 32 of the lever frame 10 and comprises an elongated cam member 36 secured on a shaft 38, that is journalled in the upper end of a bracket 40, of suitable height, that is mounted on the plate 26, in position to have the cam 36, when in horizontal position, overlie the web 32. A handle 42 is secured to the other end of the shaft 38, with its longitudinal axis at right angles to the longitudinal axis of the cam 36. Thus, normally, the cam 36 will be disposed with its longitudinal axis in horizontal position, parallel to the web 32, to permit the forward end of the lever frame 10 to remain in elevated position, by weight of the inverted U-member 28, which is normally in lowered, pin depressing position, to keep the circuit through the switch broken. When it is desired to close the telephone circuit, the handle 42 is turned to rotate the cam 36 through an angle of 90°, and have its rounded end 44 depress and hold the web 32 in depressed position, thereby raising the U-member 28 and releasing the switch pins 18 to close the circuit through the instrument.

In order to insure proper, vertical reciprocation of the inverted U-member 28, to avoid its striking against the sides of the cradle 16, which might interfere with its proper operation, the U-member 28 may be guided in its vertical movement. For that purpose, it may be pivotally connected by the ends of its arms 30 to the frame arms 12 and guide links 46 may be provided, preferably on each side of the lever frame, one end of each of which links may be pivotally secured to an arm of the U-member 28, as at 48, and the other end pivotally secured to an extension of the bracket 20, in parallel relation to the frame arm 12 pivoted thereon.

In the embodiment of Figs. 3–7, inclusive, of the drawings, the device is shown to comprise a table 50, on which the instrument base 14 rests, and which is supported in raised position upon a surface, and the mechanism for controlling the normal movement of the pin actuating member is shown as being located below such table. Preferably, as illustrated, the table 50 may comprise the top wall of a hollow stand which also includes a bottom wall 52, side walls 54, and a front wall 56.

The pin-actuating member of this embodiment of the invention comprises a horizontally disposed bar 60 supported over the cradle 16 by a rearwardly extending arm 62, that may be integrally formed therewith, and which is provided with a depending extension 64, that is guided in the slot 66, formed in an upright guide post 68, which may be secured by a laterally offset end extension 70, to the bottom wall 52 of the stand. The depending arm 64 is shown as disposed inwardly of the upright guiding post 68, and is guided in the slot or keyway 66 thereof by means of a struck-out lug 72, and a projection 74 formed by a crease in the depending arm portion 64. However, it will be clear that any suitable key projections, of any kind whatever, provided on the depending arm 64 and engaging in the guide slot 66 will serve the purpose intended.

The lower end of the depending arm 64 is secured to the end of a lever 76, as by the screw 78, which engages a laterally offset end of the lever 76 and passes through the end of the depending arm 64 and guide slot 66 and is engaged by a pair of nuts 80. The lever 76 is pivoted intermediate its ends, as at 82, on an upright bracket or post 86 which is supported within the stand, preferably on the bottom wall 52 thereof, in any desired manner. The lever 76 extends forwardly into the stand to a point in advance of the position of the telephone base operatively disposed upon the top wall 50 thereof. The lever 76 is normally maintained with its rear end upwardly disposed, in position to elevate the depending arm 64 and maintain the pin-actuating bar 60 in the telephone switch closing position. This may be effected by a pair of contracting springs 88 and 90, one of which engages the bracket 86 above the pivot point 82 by one end and, by its other end, engages the rear portion of the lever 76. The other of the springs engages the bracket 86 below the pivot point 82 with one end, and by its other end engages the forward portion of the lever 76.

The forward end of the lever 76 may be guided in the space 92, between two upright posts 94 secured to the bottom wall 52 of the stand, and means are provided forwardly of said guide posts 94 for elevating the forward end of the lever 76, so as to lower the member 60 upon the switch pins 18, and for releasably retaining the forward end of the lever in elevated position. The lever-elevating means may comprise an arm 96 having, preferably, a knob 98, at one end and a curved portion 100, at its other end. The arm 96 is pivoted on a post 102, to one side of the forward lever end, in position to have its curved end 100 underlie such forward lever end, with its knob projected into an opening 104 formed in the top wall 50 of the stand. Pressure applied to the knob 98 through the opening 104 will elevate the other end of the arm 96 and raise the forward end of the lever 76 to depress its rear end and lower the member 60 upon the switch pins 18, to open the telephone circuit switch and break the circuit therethrough.

Figures 4, 5, 6, 7:
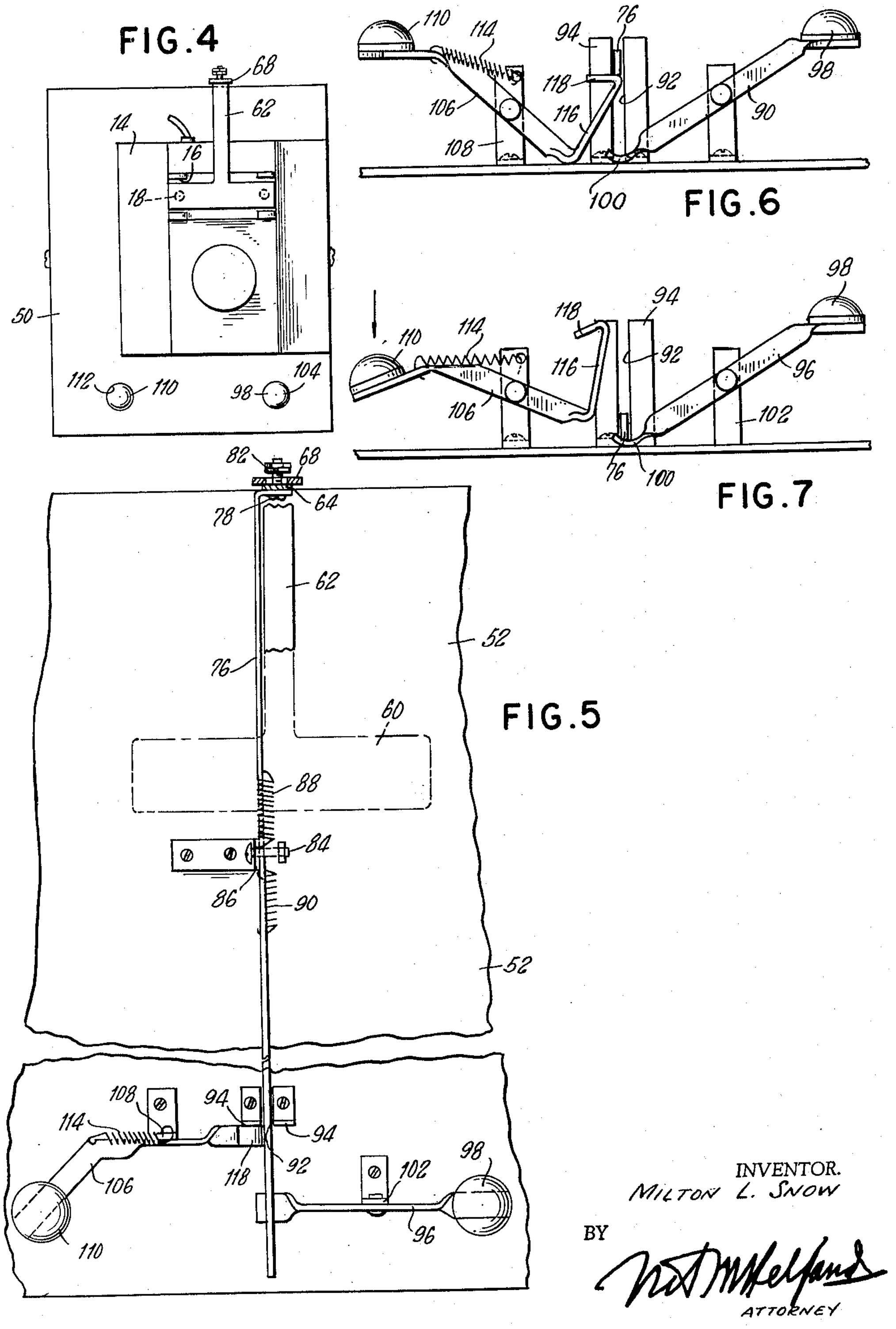
Fig. 4 is a top plan view of the telephone base and its switch control mechanism of Fig. 3; shown on reduced scale.
Fig. 5 is a fragmentary, foreshortened, top plan view of the device of Fig. 3, with the top wall of the telephone base supporting stand removed.
Fig. 6 is a front end view taken on line 6—6 of Fig. 5; showing the device in switch closing position.
Fig. 7 is a view similar to that of Fig. 6, with the device shown in switch closing position.

To maintain the lever 76 with its forward end raised, as more clearly shown in Fig. 6 of the drawing, there is provided to the other side of the guide posts 94 a second arm 106 pivoted intermediate its ends, on a post 108. The arm 106 carries a knob 110 at one end, immediately below a second opening 112, in the top wall 50 of the stand. A spring 114 connected to the arm 106 and the post 108 normally maintains the arm 106 in a diagonal position with its knob end uppermost and its other end resting upon the bottom wall 52 of the stand, adjacent the guideway 92. The lower end of the arm 106 is provided with an upwardly directed extension 116 having a laterally offset end 118, which is directed towards the arm-supporting post 108. The extension 118 is formed to normally have its upper end portion disposed in front of the space 92 between the guide post 94. Thus, when the front end of the lever 76 is raised by the arm 96, the lever will push the upper end of the extension 118 out of the way, to be moved thereabove, and, when the lever clears such extension 118, the latter will be automatically resiliently moved back into place in front of the space 92, to underlie the front end of the lever 76 and maintain it in elevated position. Pressure on the knob 114 will cause the arm extension 116 to move away from the space 92 below the front end of the lever 76, permitting the latter to be depressed to its normal position by the action of the springs 88 and 90.

To support the handpiece 120 of the telephone instrument for quick, easy and secure mounting and dismounting, there is provided a standard including a base 122, supporting a generally upright arm 124, which may consist of a gooseneck tube or of a rigid rod having suitable universal joints for both vertical and lateral adjustment. The upright arm 124 may be provided at its upper end with a preferably triangular socket 126, and the handpiece 120 may have attached thereto, as by clamp arms 128, a triangular wedge-shaped bar 130, that may fit into the socket 126. Such arrangement, because of the depth of the socket and of the bar 126 and 130, respectively, and of the wedging action between them, permits both the safe and secure positioning of the handpiece upon the standard, as well as its quick and easy removal therefrom.

This completes the description of the several embodiments of the device of the present invention. It will be readily apparent that such device permits the convenient, hand-free use of a telephone instrument for the purpose of speaking and listening and also permits the manipulation of the telephone instrument switch from a point distant from such switch to provide an increased amount of space between the instrument and the user within which he may use his free hands to advantage.

It will also be apparent that such device is of relatively simple construction, highly efficient and effective for its purpose and constitutes an ornametnal adjunct to a telephone instrument.

It will be further apparent that numerous variations and modifications may be made in the device of the present invention, by any one skilled in the art, in accordance with the principles of the invention hereinabove and without the exercise of any inventive ingenuity. I desire, therefore, to be protected for any and all such variations and modifications that may be made within the spirit of the invention and the scope of the claims hereto appended.

What I claim is:

1. A device for controlling the switch of the main circuit through a telephone instrument base, said switch having means spring-tensioned to normally project from said base and maintaining said switch in closed position, comprising a platform for said instrument base freely movable over a supporting surface, said base supported on said platform, a member overlying said projecting means, means on said platform supporting said member for vertical reciprocal movement into and out of projecting means depressing position, means moving said member into and out of projecting means depressing position, including a second member movably supported on said platform along a lower portion of said base and in elevated relation to said platform supporting surface, means on said platform normally automatically urging said second member to move said first member to one of said positions thereof and manually operable means on said platform adapted to releasably maintain said second member in position of holding said first member in the other of said positions thereof.

2. A device for controlling the switch of the main circuit through a telephone instrument base, said switch having means spring-tensioned to normally project from said base and maintaining said switch in closed position, comprising a platform for said base freely movable over a supporting surface, said base supported on said platform, a member overlying said projecting means, means on said platform supporting said member for vertical reciprocation into and out of projecting means depressing position, means moving said member into and out of projecting means depressing position including a second member movably supported on said platform along a lower portion of said base and in elevated relation to said supporting surface, means on said platform normally urging said second member to move said first member into one of said positions thereof, said second member manually movable into position of maintaining said first member in the other of said positions thereof, and manually releasable latch means on said platform automatically engaging said second member to maintain it in said manually movable position thereof.

3. A device for controlling the switch of the main circuit through a telephone instrument base, said switch having means spring-tensioned to normally project from said base maintaining said switch in closed position, comprising a platform for the said base freely movable over a supporting surface, said base supported on said platform, a member overlying said projecting means, means on said platform supporting said member for vertical reciprocal movement into and out of projecting means depressing position, means supported on said platform normally automatically moving said member into one of said positions thereof, means, including an arm supported on said platform in elevated relation to said supporting surface and alongside a lower portion of said base, said arm movable to move said member into the other of said positions thereof, and releasable means on said platform engageable on said arm for maintaining said arm in position of maintaining said member in said other position thereof.

4. A device for controlling the switch of the main circuit through a telephone instrument base, said switch having means spring-tensioned to normally project from said base and maintaining said switch in closed position, comprising a platform for said base freely movable on a supporting surface, said base supported on said platform, a member movably supported on said platform for movement into and out of projecting means depressing position, and means, including an arm movably supported on said platform in elevated relation to the supporting surface therefor and alongside a lower portion of said base, for moving said member in and out of projecting means depressing position, means on said platform normally automatically moving said arm to move said member into one of said positions thereof, said arm manually movable for moving said member into the other of said positions thereof, and means releasably maintaining said arm in said manually disposed position.

5. A device for controlling the switch of the main circuit through a telephone instrument base, said switch having means spring tensioned to normally project from said base maintaining said switch in closed position, comprising a platform for said base freely movable on a supporting surface, said base supported on said platform, a member supported on said platform for movement into and out of projecting means depressing position, means moving said member into and out of projecting means depressing position, said last named means including an approximately horizontally disposed bar alongside a lower portion of said base, means on said platform supporting said bar for reciprocal movement, means interconnecting said bar with said member for movement of said member into one of said positions thereof upon the movement of said bar in one of the reciprocal directions thereof and for movement of said member into the other of said positions thereof upon movement of said bar into the other reciprocal direction thereof, means on said platform automatically moving said bar to one direction thereof, said bar manually movable to the other direction thereof, and releasable means engageable on said bar for maintaining it in said manually moved position thereof.

6. A device for controlling the switch of the main circuit through a telephone instrument base, said switch having means spring-tensioned to normally project from said base and maintaining said switch in closed position, comprising a body associated with the lower portion of said base and movable therewith along a supporting surface, a member overlying said projecting means, means on said body supporting said member for vertical reciprocal movement into and out of projecting means depressing position, resilient means supported on said body normally maintaining said member in one of said positions, means including an arm supported on said body in substantially horizontal position and alongside the lower portion of said base, said arm movable to move said member into the other of said positions thereof, and releasable means on said body engaging said arm for maintaining the same in position of maintaining said member in said other position thereof.

7. A device for actuating the switch of the main circuit in a telephone instrument base, said switch having spring tensioned means to normally maintain said circuit in closed position, including a pair of pins projecting from said base, depressible to open said circuit, comprising a U-shaped lever, means pivotally supporting said lever intermediate its ends in substantially horizontal position, the said lever adapted to have at least the forward end of a telephone instrument base, to and including the portion having said pins projecting therefrom, disposed between the arms thereof, a bar, means supporting said bar on the arms of said lever in position to overlie said projecting pins, means normally automatically moving said bar into depressing contact with said pins, and means manually operable releasably engaging the forward end of said lever when in depressed position to maintain the same in depressed position for lifting said bar from said pins.

8. The device of claim 7, wherein said bar is weighted to normally gravitationally press down upon said pins.

9. The device of claim 7, wherein said bar is spring tensioned to normally remain in pin-depressing position.

10. The device of claim 7, wherein said bar is provided with depending arms, each pivotally engaged at its free end to one of said lever arms and means are provided for guiding the bar in its movement toward and away from said pins.

11. The device of claim 7, wherein said bar is provided with depending arms each pivotally engaged at its free end to one of said lever arms and means are provided for guiding said bar in its movement toward and away from said pins, including at least one link pivoted by one end to one of said bar arms and by its other end to said lever arm supporting means in parallel relation to said lever arm.

12. The device of claim 7, wherein said manually operable means includes a cam rotatable to engage said lever at its forward end for depressing the same, means rotatably supporting said cam, and handle means on said cam supporting means for rotating said cam.

13. A device for actuating the switch of the main circuit in a telephone base, said switch having spring tensioned means to normally maintain said circuit in closed position, including a pair of pins projecting from said base and depressible to open said circuit, comprising a bar, means supporting said bar above said pins for vertical reciprocation in and out of pin depressing position including an upright arm connected to and laterally spaced from said bar, an upright guide post for said upright arm and means slidably interengaging said upright arm with said guide post, means for vertically reciprocating said upright arm including a lever, means pivotally supporting said lever intermediate its ends, one end of said lever engaging the lower end of said upright arm, means normally automatically moving said lever to support said bar in one of said positions, means for moving said lever into the other end of said positions, and releasable means retaining said lever in said other position.

14. The device of claim 13, including a stand adapted to support said telephone base, said guide post being secured to said stand.

15. The device of claim 13, including a stand, and wherein said means normally moving said lever into the first of said positions comprises a spring engaging said lever by one end thereof and said stand by the other end thereof.

16. The device of claim 13, wherein said lever is normally, automatically maintained with its arm-connected end in elevated position and means are provided for releasably supporting the other end of said lever in elevated position.

17. The device of claim 13, wherein said lever is normally maintained with its arm-connected end in elevated position and releasable means are secured to said stand for maintaining the other end of said lever in elevated position.

18. The device of claim 13, wherein said lever is normally, automatically maintained with its arm-connected end in elevated position and means are provided for releasably supporting the other end of said lever in elevated position, said last means comprising spaced guiding elements between which said free lever end is reciprocable, a pivotally supported detent member mounted on said stand adjacent said guiding elements, means normally, resiliently holding said detent member in position across the space between the said guiding elements, to underlie the free end of said lever when in raised position, said detent member movable by said free lever end, as it is raised, away from lever-supporting position.

19. The device of claim 13, wherein said lever is normally, automatically maintained with its arm-connected end in elevated position and means are provided for releasably supporting the other end of said lever in elevated position, said last means comprising spaced guiding elements between which said free lever end is reciprocable, a pivotally supported detent member mounted on said stand adjacent said guiding elements, means normally, resiliently maintaining said detent member in position across the space between the said guiding elements to underlie the free end of said lever when in raised position, said detent member movable away from lever-supporting position, and wherein means are provided for raising the normally depressed free end of said lever, said lever-raising means comprising an arm pivotally supported on said stand, said arm having an end thereof normally underlying the free end of said lever when in depressed position and tiltable to raise the said lever end above said detent member.

20. The device of claim 13, including a hollow stand, and wherein said lever is supported within said hollow stand.

References Cited in the file of this patent

UNITED STATES PATENTS

| | | |
|---|---|---|
| 1,847,649 | Hazard | Mar. 1, 1932 |
| 2,310,032 | Mathieson | Feb. 2, 1943 |
| 2,435,816 | Anderson | Feb. 10, 1948 |
| 2,696,528 | Chesick | Dec. 7, 1954 |
| 2,712,039 | Holmes | June 28, 1955 |
| 2,766,330 | Olsen | Oct. 9, 1956 |
| 2,835,745 | Romano | May 20, 1958 |